(12) United States Patent
Maloney

(10) Patent No.: US 11,917,068 B1
(45) Date of Patent: Feb. 27, 2024

(54) SYSTEM, APPARATUS, AND METHOD FOR SECURE EXCHANGE OF PERSONAL INFORMATION

(71) Applicant: Thomas William Maloney, St. Petersburg, FL (US)

(72) Inventor: Thomas William Maloney, St. Petersburg, FL (US)

( * ) Notice: Subject to any disclaimer, the term of this patent is extended or adjusted under 35 U.S.C. 154(b) by 0 days.

(21) Appl. No.: 17/446,214

(22) Filed: Aug. 27, 2021

Related U.S. Application Data

(60) Provisional application No. 62/705,473, filed on Jun. 29, 2020.

(51) Int. Cl.
*H04L 9/32* (2006.01)
*H04L 9/08* (2006.01)

(52) U.S. Cl.
CPC ............ *H04L 9/3228* (2013.01); *H04L 9/088* (2013.01); *H04L 9/0827* (2013.01)

(58) Field of Classification Search
CPC ...... H04L 9/3228; H04L 9/0827; H04L 9/088
See application file for complete search history.

(56) References Cited

U.S. PATENT DOCUMENTS

| | | | |
|---|---|---|---|
| 6,523,116 B1 | 2/2003 | Berman | |
| 7,784,087 B2 | 8/2010 | Yami et al. | |
| 7,857,225 B2 | 12/2010 | Challa et al. | |
| 8,746,568 B2 | 6/2014 | Edwards | |
| 8,849,718 B2 | 9/2014 | Dala et al. | |
| 9,026,797 B2 | 5/2015 | Yi | |
| 9,107,065 B2 | 8/2015 | Dharawat et al. | |
| 9,197,637 B2 | 11/2015 | Sy et al. | |
| 9,251,723 B2 | 2/2016 | Moses et al. | |
| 9,292,697 B2 | 3/2016 | Dougharty et al. | |
| 9,432,182 B2 | 8/2016 | Barrus et al. | |
| 9,824,186 B2 | 11/2017 | Lacey | |
| 9,965,565 B2 | 5/2018 | Bu et al. | |
| 10,348,699 B2 | 7/2019 | Starosielsky et al. | |
| 10,535,062 B1 | 1/2020 | Rule et al. | |
| 2006/0009692 A1 | 1/2006 | Fukuda et al. | |
| 2009/0307497 A1 | 12/2009 | Appenzeller et al. | |
| 2011/0055547 A1 | 3/2011 | Lee et al. | |
| 2011/0281630 A1 | 11/2011 | Omar | |
| 2015/0178721 A1 | 6/2015 | Pandiarajan et al. | |

(Continued)

OTHER PUBLICATIONS

Overview and an Approach for QR-Code Based Messaging and File Sharing on Android Platform in View of Security, by Shah et al., published 2017 (Year: 2017).*

*Primary Examiner* — Vu V Tran
(74) *Attorney, Agent, or Firm* — Squire Patent Consulting & IP Law LLC; Brendan E. Squire

(57) ABSTRACT

A system, method, and apparatus to securely transfer encrypted personal information between devices via code scanning is disclosed. This system provides convenience for both the user and the recipient of the private data in the forms of speed of information transfer and encrypted security of the information shared with the safety of being contactless exchange of information. The user stores encrypted personal information on their mobile computing device. Scanning a unique ID, generated by a recipient, initiates a secure connection between the user and the recipient. The user may be prompted to confirm the transfer of their personal information when the secure connection is established.

6 Claims, 2 Drawing Sheets

(56) References Cited

U.S. PATENT DOCUMENTS

| | | | |
|---|---|---|---|
| 2016/0034990 A1 | 2/2016 | Kannair | |
| 2017/0270249 A1* | 9/2017 | Beerling | H04W 12/06 |
| 2018/0307846 A1 | 10/2018 | Hertling et al. | |
| 2019/0130082 A1 | 5/2019 | Alameh et al. | |
| 2019/0356479 A1 | 11/2019 | Grimme | |
| 2020/0076772 A1* | 3/2020 | Kapp | H04L 9/0656 |
| 2020/0154276 A1* | 5/2020 | Minakawa | H04W 76/10 |
| 2021/0044558 A1* | 2/2021 | Eisen | H04L 63/0838 |
| 2021/0243185 A1* | 8/2021 | Thasale | G06K 7/1413 |
| 2021/0304197 A1* | 9/2021 | Pomassl | G06Q 20/3223 |
| 2021/0314376 A1* | 10/2021 | Doida | H04N 21/4753 |

\* cited by examiner

SYSTEM, APPARATUS, AND METHOD FOR SECURE EXCHANGE OF PERSONAL INFORMATION

CROSS-REFERENCE TO RELATED APPLICATION

This application claims the benefit of priority of U.S. provisional application No. 62/705,473 filed Jun. 29, 2020, the contents of which are herein incorporated by reference.

BACKGROUND OF THE INVENTION

The present invention relates to data transfer and more particularly to systems and methods for transferring personal information.

Current apparatus and methods of sharing personal and private information, such as contact information, demographic information, or medical information is generally insecure, tedious and time consuming. Paper documents with vital information can be lost or mishandled, leaving both parties open to security risks and allow for mistakes during subsequent data entry. Contact with physical materials during these processes can facilitate germ and virus transmission as well.

Previously, medical offices, veterinary offices, schools, or sport registrations, and the like utilize a volume of paperwork, requiring a user to fill out necessary personal and private details.

The inconvenience, cost and use of materials, and consumption of time with filling out paper forms could be completely eliminated through digital transfer methods. However, other digital transfer systems are designed for the specificity of the organization requesting the information and once the data is entered from the user, that data persists only on the recipient's system.

As can be seen, there is a need for improved systems, methods, and apparatus that allow the user to store their personal information on their mobile device, ready to be securely transferred to a recipient using the system.

SUMMARY OF THE INVENTION

In one aspect of the present invention, a computer program product configured for providing a secure exchange of a personal information data is disclosed. The computer program product including at least one non-transitory computer-readable storage medium having computer-executable program code instructions stored therein. The computer-executable program code instructions comprising program code instructions for generating, by a recipient computing device, a unique visual code embedded with an identification data of a recipient. The unique visual code is transmitted to a recipient computing device via a communication network. A one-time use shared key pair code is received from a sender computing device via the communications network. The one-time use shared key pair code generated responsive to an acceptance of the unique visual code by a sender of the personal information data. An end-to-end encrypted connection is created on the communication network between the recipient computing device and the sender computing device.

In some embodiments, the instructions may include those for receiving an encrypted personal information data on the recipient computing device via the end-to-end encrypted connection.

In some embodiments, the instructions include those for decrypting the encrypted personal information data as a sender personal information data on the recipient computing device utilizing the one-time use shared key pair code.

In some embodiments, the instructions include those for displaying the sender personal information data on a display of the recipient computing device.

In other aspects of the invention, a computer program product configured for providing a secure exchange of personal information data is disclosed. The computer program product includes at least one non-transitory computer-readable storage medium having computer-executable program code instructions stored therein. The computer-executable program code instructions include program code instructions for imaging by a camera of a sender computing device, a unique visual code embedded with an identification data of a recipient and a personal information data request from the recipient. A sender personal information data corresponding to the personal information data request is received via an input device of a sender computing device. The sender personal information data is encrypted as an encrypted personal information data on the sender computing device, The encrypted personal information data is stored in the at least one non-transitory computer-readable storage medium of the sender computing device. An identification data of the recipient is presented on a display of the sender computing device. A one-time use shared key pair code is transmitted from the sender computing device via a communication network. An end-to-end encrypted connection is created on the communication network between the sender computing device and a recipient computing device according to the one-time use shared key pair code.

In some embodiments, the instructions include those for transmitting the encrypted personal information data from the recipient computing device via the end-to-end encrypted connection.

In some embodiments, the instructions include those for decrypting the encrypted personal information data as a sender personal information data on the recipient computing device utilizing the one-time use shared key pair code.

In some embodiments, the instructions include those for displaying the sender personal information data on a display of the recipient computing device.

In some embodiments, the instructions include those for receiving an acceptance of the recipient personal information data request via a user interface of the sender computing device.

In some embodiments, the instructions include those for creating the end-to-end encrypted connection after receiving the acceptance.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, embodiments of the present invention provide a system method and apparatus that provides convenience for both the user and the recipient of personal data in the form of speed of information transfer and encrypted security of the information shared, all with the safety of being a contact less transfer.

Previously, medical offices, veterinary offices, school or sport registrations, and the like would utilize a volume of paperwork requiring a user to fill out necessary personal and private details. Employing the present invention allows that process to be bypassed quickly while being contact free and secure. These previous digital and paper systems do not allow the user to easily and securely store, maintain and share their personal information using their own mobile device(s). This gives the user an added convenience of already having their information stored securely and ready to share.

The present invention provides convenience for both the user and the recipient of the data in the forms of speed of information transfer and encrypted security of the information shared with the safety of being contact less.

Figure 1:
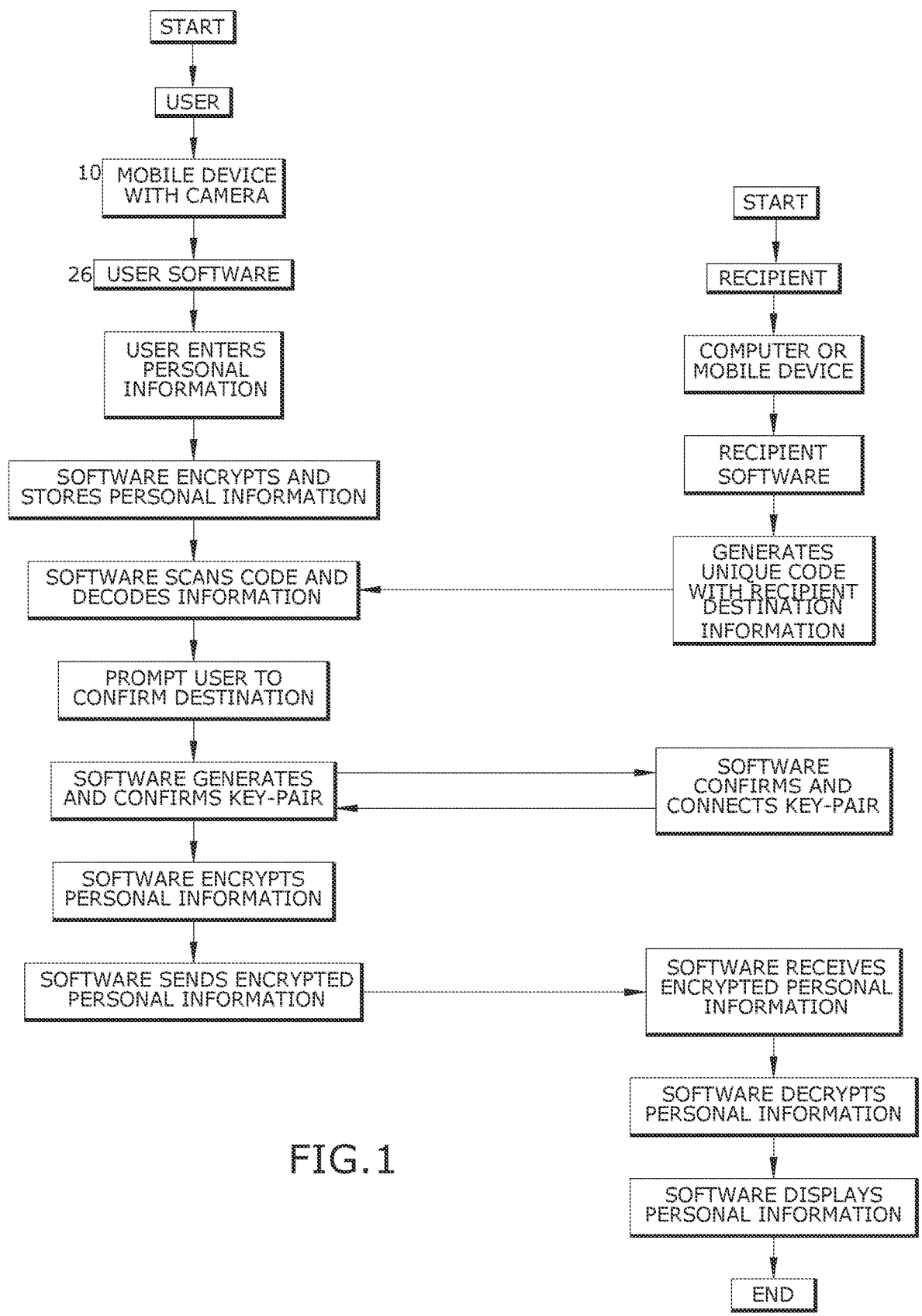
FIG. 1 is a is a flowchart illustrating a process for secure exchange of personal information.
Figure 2:
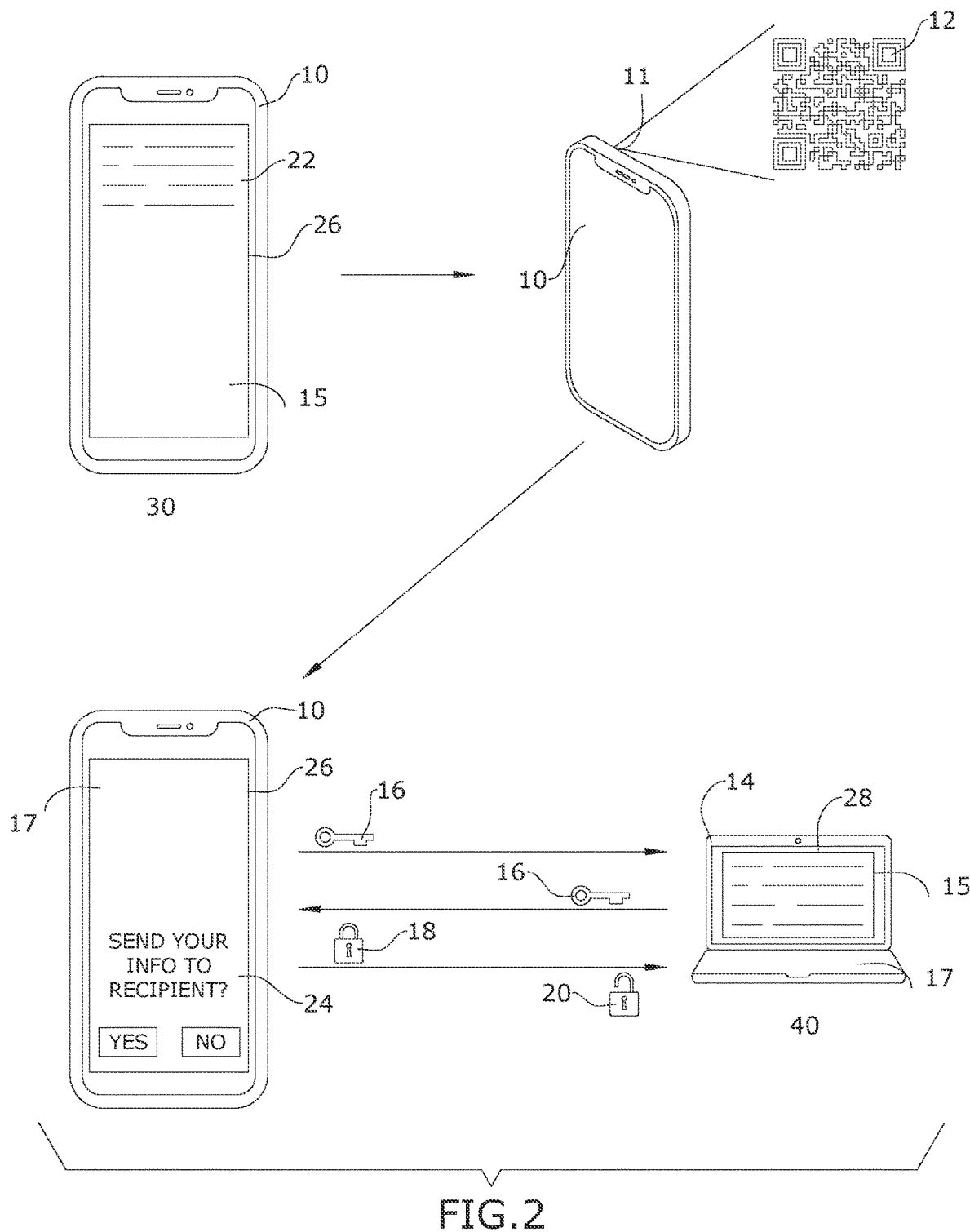
FIG. 2 is a diagram illustrating a secure exchange of personal information.

As seen in reference to FIG. 1, a system according to aspects of the invention may include the following elements: a mobile computing device 10 provisioned with a camera 11; a computer 14 with an internet connection; a visible uniquely generated code 12 via screen or print; a computer monitor or display 15; a computer keyboard or input device 17, such as a touchscreen, manually manipulable computer controlling device, or voice command system 17; a computer-readable storage medium (not shown, containing an application software 20.

All computer and peripherals, computer monitor 15, computer keyboard or other manually manipulable computer controlling device 17 are connected to a computer 10, 14 with an internet connection to access a recipient version of an application software 20. The recipient provides a visible unique code 12 via screen or print which the recipient and sender utilize for secure exchange of personal information from the sender. The user version of this software 26 is installed on a mobile device 10 to scan the visible unique code 12 of the recipient, which initiates a secure data transfer connection.

A process for secure exchange of personal information is shown in reference to FIG. 1. The application software 26 on a mobile device 10 of a sender 30 that allows the sender 30 to enter personal information 22 on their mobile computing device 10. The software 26 securely stores personally identifiable information on the sender 30 mobile computing device 10 in an encrypted format. The sender 30 utilizes their mobile device 10 camera 11 to scan the visible unique code 12 that is encoded with a recipient 40 destination information.

When the software 26 is authenticated from a recipient computer 14 connected to the internet, the sender mobile application 26 and device 10 will create an end-to-end encrypted connection with the recipient 40 computing device 14 via a one-time use shared key pair code 16. The sender 30 device 10 will send the encrypted personal information 18 to the recipient device 14. The recipient device 14 then decrypts the encrypted personal information 18 for the recipient to be able to view as a shared personal information data 28 on their display 15.

When a sender 30 scans the unique recipient code 12 utilizing the camera 11 of their mobile computing, the application software decodes one or more recipient data elements embedded, the recipeint 40 destination information embedded in the unique recipient code 12 to inform the sender 30 of an identity of the recipient 40 the identity providing the sender 30 an identifying date of exactly where/who their personal information data is being transferred to. The sender 30 can then accept or reject the transferring of their personal information to the recipient 40.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A computer program product configured for providing a secure exchange of personal information data, the computer program product comprising at least one non-transitory computer-readable storage medium having computer-executable program code instructions stored therein, the computer-executable program code instructions comprising program code instructions for:

imaging by a camera of a sender computing device, a unique visual code embedded with a recipient destination information, and a personal information data request from the recipient;

receiving a sender personal information data corresponding to the personal information data request via an input device of a sender computing device;

encrypting the sender personal information data as an encrypted personal information data on the sender computing device;

storing the encrypted personal information data in the at least one non-transitory computer-readable storage medium of the sender computing device;

presenting on a display of the sender computing device the recipient destination information;

transmitting a one-time use shared key pair code from the sender computing device via a communication network, and creating, on the communication network, an end-to-end encrypted connection between the sender computing device and a recipient computing device according to the one-time use shared key pair code.

2. The computer program product of claim 1, further comprising:

transmitting the encrypted personal information data from the recipient computing device via the end-to-end encrypted connection.

3. The computer program product of claim 2, further comprising:

decrypting the encrypted personal information data as a sender personal information data on the recipient computing device utilizing the one-time use shared key pair code.

4. The computer program product of claim 3, further comprising:

displaying the sender personal information data on a display of the recipient computing device.

5. The computer program product of claim 1, further comprising:

receiving an acceptance of the recipient personal information data request via a user interface of the sender computing device.

6. The computer program product of claim 5, further comprising:

creating the end-to-end encrypted connection after receiving the acceptance of the recipient destination information.

* * * * *